Mar. 6, 1923.

J. P. HEIL ET AL

BUMPER

Filed Nov. 7, 1921

1,447,387

INVENTOR.
Julius P. Heil and
BY Charles Wesenberg.
Morsell + Kearney
ATTORNEYS.

Patented Mar. 6, 1923.

1,447,387

UNITED STATES PATENT OFFICE.

JULIUS P. HEIL AND CHARLES WESENBERG, OF MILWAUKEE, WISCONSIN, ASSIGNORS TO THE HEIL CO., OF MILWAUKEE, WISCONSIN, A CORPORATION OF WISCONSIN.

BUMPER.

Application filed November 7, 1921. Serial No. 513,468.

*To all whom it may concern:*

Be it known that we, JULIUS P. HEIL and CHARLES WESENBERG, citizens of the United States, and residents of Milwaukee, Wisconsin, in the county of Milwaukee and State of Wisconsin, have invented new and useful Improvements in Bumpers, of which the following is a description, reference being had to the accompanying drawings, which are a part of this specification.

This invention relates to improvements in bumpers for motor vehicles and particularly to bumpers adapted to protect parts or fixtures carried by the motor vehicle and which have to be used quite frequently, for example, the faucets arranged on the rear of a tank truck for delivering oil to the retail trade.

One of the objects of the invention is to provide novel means for mounting the bumper on the frame of the vehicle which is of such construction that the bumper may be conveniently swung from its normal position out of the way when it is desired to manipulate the parts or fixtures specially protected by the bumper.

In its preferred form the invention contemplates the combination with a frame of a motor vehicle having a pair of supporting arms, of a bumper provided with a pair of arms adapted to be pivotally connected to the respective first mentioned supporting arms, so that the bumper may be swung into or out of its normal position; and a further object of the invention is to provide means adapted to lock the bumper in its normal position.

The locking means for the bumper preferably comprises a pair of locking bolts slidably mounted on the bumper and adapted to enter suitable recesses formed in the respective supporting arms provided on the frame of the motor vehicle; and a further object of the invention is to provide means adapted to operate the locking bolts simultaneously which preferably comprises a disk pivotally mounted on the bumper and to which the locking bolts are pivotally connected whereby upon rotation of the disk the locking bolts may be manipulated, as desired.

The invention consists in the novel constructions, arrangements and devices to be hereinafter described and claimed for carrying out the above stated objects and such other objects as will appear from the following description of a certain preferred embodiment illustrated in the accompanying drawings, wherein—

Like characters of reference designate like parts in the several views.

Figure 1:
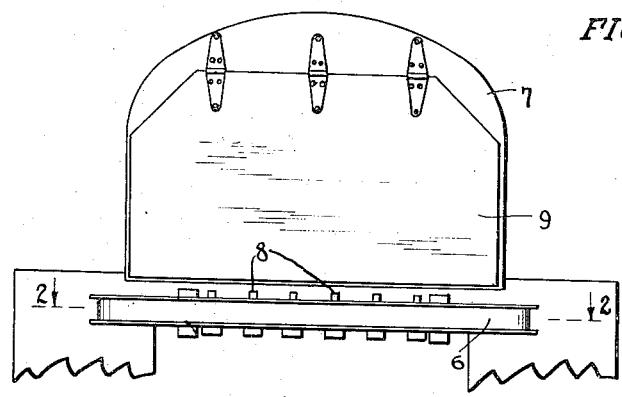
Fig. 1 is a rear elevational view of a fragmentary portion of a motor vehicle equipped with an oil tank and provided with a bumper embodying the principles of the invention.
Figure 2:
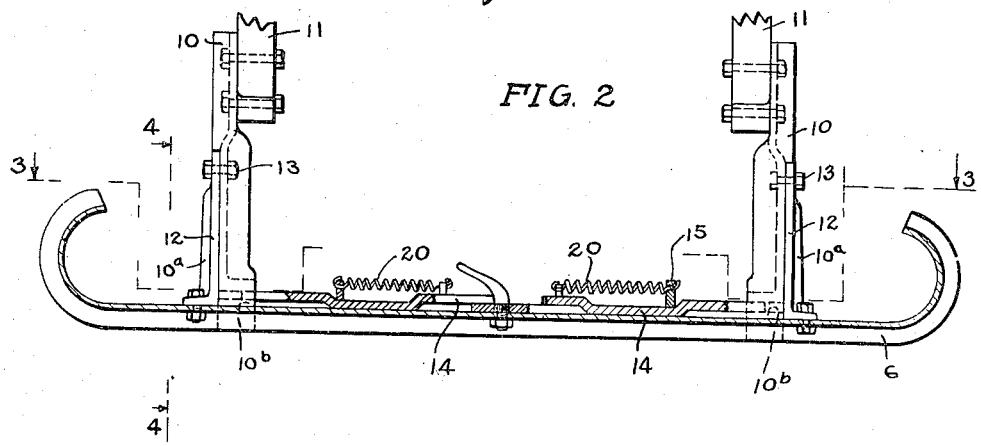
Fig. 2 is a sectional view, on an enlarged scale, taken on the line 2—2 of Fig. 1.

Referring now to the drawings, it will be seen that the invention is illustrated as embodied in bumper 6 mounted on the rear end of the motor vehicle which is equipped with an oil tank 7 having a plurality of faucets 8 connected to pipes (not shown) running to the respective compartments of the tank, the faucets being arranged underneath a compartment 9 in which the measuring and delivering receptacles for the oil are usually housed.

Figure 3:
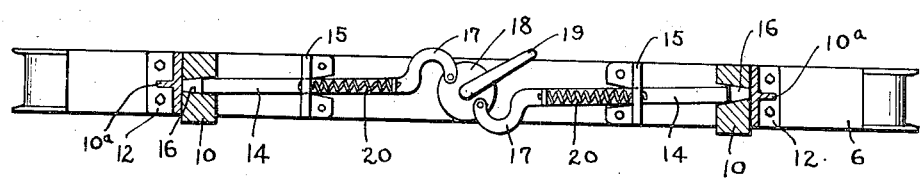
Fig. 3 is a sectional view taken approximately on the line 3—3 of Fig. 2.
Figure 4:
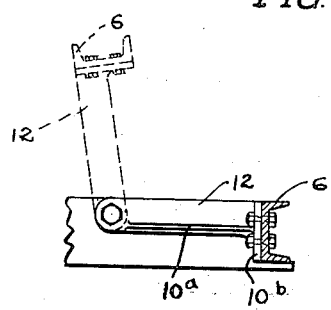
Fig. 4 is a sectional view taken on the line 4—4 of Fig. 2.

The bumper may be mounted on the frame of the vehicle in a number of ways, but in the embodiment shown rearwardly extending supporting arms 10 are secured to the longitudinally extending frame members 11 of the vehicle. The bumper is bolted or otherwise rigidly secured to a pair of forwardly extending arms 12 which are pivotally connected at their forward ends by bolts 13 to the respective supporting arms 10. By this arrangement the bumper is pivotally mounted on the frame of the vehicle and it will be obvious that it might be swung either upwardly or downwardly out of the way. In the embodiment herein shown the bumper is adapted to be swung upwardly from the full line position to the dotted line position shown in Fig. 4 and the supporting arms 10 are each formed so as to provide a horizontally extending flange or ledge $10^a$ which forms stop means for the respective arms attached to the bumper when the bumper is in its normal position. When in its normal position, the bumper bears squarely against the shoulders $10^b$ provided on the supporting arms 10 so that the bolts 13 are relieved of any undue strain when the member 6 is bumped, In order to secure or lock the bumper in its normal position, a pair of oppositely disposed locking bolts 14 are mounted on the bumper, these bolts slidably projecting through suitable keepers 15 fixed to the bumper, the outer ends of the bolts being adapted to project into suitable apertures or recesses 16 provided in the supporting arms 10, which apertures or recesses are preferably tapered as shown to eliminate any lost motion between the locking bolts and the members 10. The inner or adjacent ends of the locking bolts are preferably formed with a goose-neck 17 the extremities of which are pivotally connected to a disk 18 which is pivotally mounted on the bumper and is preferably provided with an operating handle 19. It will now be apparent that when the disk 18 is turned in an anti-clockwise direction, having reference to Fig. 3 of the drawings, the locking bolts will be jammed or forced into the recesses 16 provided in the respective supporting arms 10, and when the disk is turned in the opposite direction, the locking bolts will be withdrawn from the respective recesses. In order to maintain the locking bolts in operative engagement with the supporting arms 10, tension springs 20 are provided, one end of each spring being connected to one of the keepers 15 and the other end thereof to the adjacent locking bolt 14. It will be noted that the connections between the locking bolts and the disk 18 are such that the disk may be turned to such an extent to withdraw the locking bolts from the respective apertures or recesses 16, that the pivotal connections between the bolts and the disk will be swung around beyond a horizontal line drawn axially through the fulcrum of the disk thereby holding the bolts in unlocked position against the tension of the springs.

We claim:

1. The combination with the frame of a motor vehicle having a pair of supporting arms, of a bumper, a pair of arms carried by said bumper and pivotally connected to said supporting arms whereby said bumper may be swung out of its normal position, spring actuated locking bolts for locking said bumper in its normal position, and means for withdrawing said bolts and securing the same in their inoperative position against the action of their springs.

2. The combination with the frame of a motor vehicle having a pair of supporting arms, of a bumper, a pair of arms carried by said bumper and pivotally connected to said supporting arms whereby said bumper may be swung out of its normal position, and simultaneously operable bolts adapted to lock said last mentioned arms when in normal position to said supporting arms.

3. The combination with the frame of a motor vehicle having a pair of supporting arms, of a bumper, a pair of arms carried by said bumper and pivotally connected to said supporting arms whereby said bumper may be swung out of its normal position, and a pair of simultaneously operable locking bolts carried by said bumper and adapted to lock said last mentioned arms when in normal position to said supporting arms.

4. The combination with the frame of a motor vehicle having a pair of supporting arms, of a bumper, a pair of arms carried by said bumper and pivotally connected to said supporting arms whereby said bumper may be swung out of its normal position, and a locking bolt carried by said bumper, one of said supporting arms having means to receive said bolt when the bumper is in normal position, for the purpose specified.

5. The combination with the frame of a motor vehicle having a pair of supporting arms, of a bumper, a pair of arms carried by said bumper and pivotally connected to said supporting arms whereby said bumper may be swung out of its normal position, a pair of locking bolts carried by said bumper, said supporting arms being formed so as to receive said bolts, respectively, when the bumper is in its normal position, and means to manipulate said bolts simultaneously.

6. The combination with the frame of a motor vehicle having a pair of supporting arms, of a bumper, a pair of arms carried by said bumper and pivotally connected to said supporting arms whereby said bumper may be swung out of its normal position, a pair of locking bolts carried by said bumper, said supporting arms being formed so as to receive said bolts, respectively, when the bumper is in its normal position, and an operating member mounted on said bumper and connected to said bolts and adapted to manipulate said bolts simultaneously.

7. The combination with the frame of a motor vehicle having a pair of supporting arms, of a bumper, a pair of arms carried by said bumper and pivotally connected to said supporting arms whereby said bumper may be swung out of its normal position, a pair of locking bolts carried by said bumper, said supporting arms being formed so as to receive said bolts, respectively, when the bumper is in its normal position, a disk pivotally mounted on said bumper and pivotally connected to said bolts, and resilient means adapted to maintain said bolts in operative engagement with said supporting arms.

8. The combination with the frame of a motor vehicle having a pair of supporting arms, of a bumper, a pair of arms carried by said bumper and pivotally connected to said supporting arms whereby said bumper may be swung out of its normal position, simultaneously operable locking bolts adapted to secure said last mentioned arms when in normal position to said supporting arms, resilient means adapted to maintain said locking means in operative position, and means for withdrawing said locking bolts and securing the same in their inoperative position against the action of said resilient means.

9. The combination with the frame of a motor vehicle having a pair of supporting arms, of a bumper, a pair of arms carried by said bumper and pivotally connected to said supporting arms whereby said bumper may be swung out of its normal position, a pair of locking bolts carried by said bumper, said supporting arms being formed so as to receive said bolts, respectively, when the bumper is in its normal position, a disk pivotally mounted on said bumper and pivotally connected to said bolts, and resilient means adapted to maintain said bolts in operative engagement with said supporting arms, the pivotal connections between said bolts and said disk being such that said bolts may be locked in their inoperative positions against the action of said resilient means.

In testimony whereof, we affix our signatures.

JULIUS P. HEIL.
CHARLES WESENBERG.